United States Patent
Kigami et al.

(10) Patent No.: US 10,094,533 B2
(45) Date of Patent: Oct. 9, 2018

(54) MARKING DEVICE FOR LAWN MOWER

(71) Applicants: HONDA MOTOR CO., LTD., Tokyo (JP); ZMP Inc., Tokyo (JP)

(72) Inventors: Minami Kigami, Wako (JP); Makoto Yamanaka, Wako (JP); Tsutomu Mizoroke, Wako (JP); Yoshihisa Hirose, Wako (JP); Kensei Yamashita, Wako (JP); Masaki Segawa, Tokyo (JP); Kazuhiro Ishikawa, Tokyo (JP); Justin Sung Jit Wong, Tokyo (JP)

(73) Assignees: Honda Motor Co., Ltd., Tokyo (JP); ZMP Inc., Tokyo (JP)

( * ) Notice: Subject to any disclaimer, the term of this patent is extended or adjusted under 35 U.S.C. 154(b) by 0 days.

(21) Appl. No.: 15/473,169

(22) Filed: Mar. 29, 2017

(65) Prior Publication Data
US 2017/0284625 A1  Oct. 5, 2017

(30) Foreign Application Priority Data

Mar. 31, 2016 (JP) ................................ 2016-071846

(51) Int. Cl.
*F21V 3/00* (2015.01)
*A01D 34/00* (2006.01)
(Continued)

(52) U.S. Cl.
CPC .............. *F21V 3/00* (2013.01); *A01D 34/008* (2013.01); *F21S 8/081* (2013.01); *F21V 15/01* (2013.01);
(Continued)

(58) Field of Classification Search
CPC .......... G01S 1/70; G05D 1/0234; F21S 8/032; F21S 8/03; F21S 8/022; F21V 3/00; F21V 15/01
See application file for complete search history.

(56) References Cited

U.S. PATENT DOCUMENTS 4,999,060 A * 3/1991 Szekely .................. F21S 8/081
136/251
5,367,442 A * 11/1994 Frost ....................... F21S 8/081
136/291

(Continued)

FOREIGN PATENT DOCUMENTS

| DE | 10 2007 036 220 A1 | 2/2009 |
| WO | 2005/093537 A1 | 10/2005 |
| WO | 2012/085851 A1 | 6/2012 |

OTHER PUBLICATIONS

Extended European Search Report dated Sep. 5, 2017, issued in corresponding European Patent Application No. 17163834.9. (6 pages).

*Primary Examiner* — Anabel Ton
(74) *Attorney, Agent, or Firm* — Fitzpatrick, Cella, Harper & Scinto

(57) ABSTRACT

A marking device includes a light-emitting unit configured to emit light, a housing configured to accommodate the light-emitting unit, and a support configured to support the housing. The housing can include a transmitting portion configured to transmit the light from the light-emitting unit through a circumferential portion of the housing, and a roof covering the light-emitting unit accommodated in the housing. The housing can include a side wall formed between every two adjacent windows of the plurality of windows.

10 Claims, 5 Drawing Sheets

(51) Int. Cl.
*F21S 8/08* (2006.01)
*F21V 15/01* (2006.01)
*G08B 5/36* (2006.01)
*G01S 1/70* (2006.01)
*G05D 1/02* (2006.01)
*F21W 111/00* (2006.01)

(52) U.S. Cl.
CPC .............. *G01S 1/70* (2013.01); *G05D 1/0234* (2013.01); *G08B 5/36* (2013.01); *F21W 2111/00* (2013.01)

(56) References Cited

U.S. PATENT DOCUMENTS

| | | | |
|---|---|---|---|
| 9,739,426 B2 * | 8/2017 | Hoechtl | F21K 9/235 |
| 9,897,279 B2 * | 2/2018 | Verbeek | F21K 9/23 |
| 2011/0299272 A1 * | 12/2011 | Ko | F21S 8/081 |
| | | | 362/183 |
| 2013/0070458 A1 * | 3/2013 | Shi | F21V 29/004 |
| | | | 362/235 |
| 2015/0271991 A1 | 10/2015 | Balutis | |
| 2016/0369979 A1 * | 12/2016 | Song | F21S 8/088 |

* cited by examiner

MARKING DEVICE FOR LAWN MOWER

CROSS-REFERENCE TO RELATED APPLICATION

This application is based upon and claims the benefit of priority from the prior Japanese Patent Application No. 2016-071846, filed on Mar. 31, 2016, the entire contents of which are incorporated herein by reference.

BACKGROUND OF THE INVENTION

Field of the Invention

The present invention relates to a marking device (for example, a beacon) for a lawn mower (for example, an autonomous lawn mowing robot).

Description of the Related Art

U.S. Patent Application Publication No. 2015/0271991 has disclosed a robot lawn mower 10 (an autonomous lawn mowing robot) as an example of a lawn mower. The robot lawn mower 10 can recognize a lawn mowing range (working range) by recognizing a boundary marker 810 (a marking device) as a beacon.

For workers or those skilled in the art, the marking device is desirably easily recognizable by a lawn mower. In other words, it is preferable that a lawn mower does not recognize a marking device for defining a working range by mistake.

SUMMARY OF THE INVENTION

One aspect of the present invention is to provide a marking device which a lawn mower can recognize more accurately. Other aspects of the present invention will become apparent to those skilled in the art by referring to the following exemplary embodiments, the best mode for carrying out the invention, and the attached drawings.

The present invention provides a marking device for a lawn mower, comprising the following elements. A light-emitting unit is configured to emit light. A housing is configured to accommodate the light-emitting unit. A support is configured to support the housing. The housing may include the following elements. A transmitting portion is configured to transmit the light through a circumferential portion of the housing. A roof covers the light-emitting unit accommodated in the housing. The transmitting portion includes a plurality of windows. The housing includes a side wall formed between every two adjacent windows of the plurality of windows.

DESCRIPTION OF THE EMBODIMENTS

The best mode for carrying out the invention to be explained below is used to easily understand the present invention. Accordingly, those skilled in the art should note that the present invention is not unreasonably limited by the embodiments to be explained below.

Figure 1:
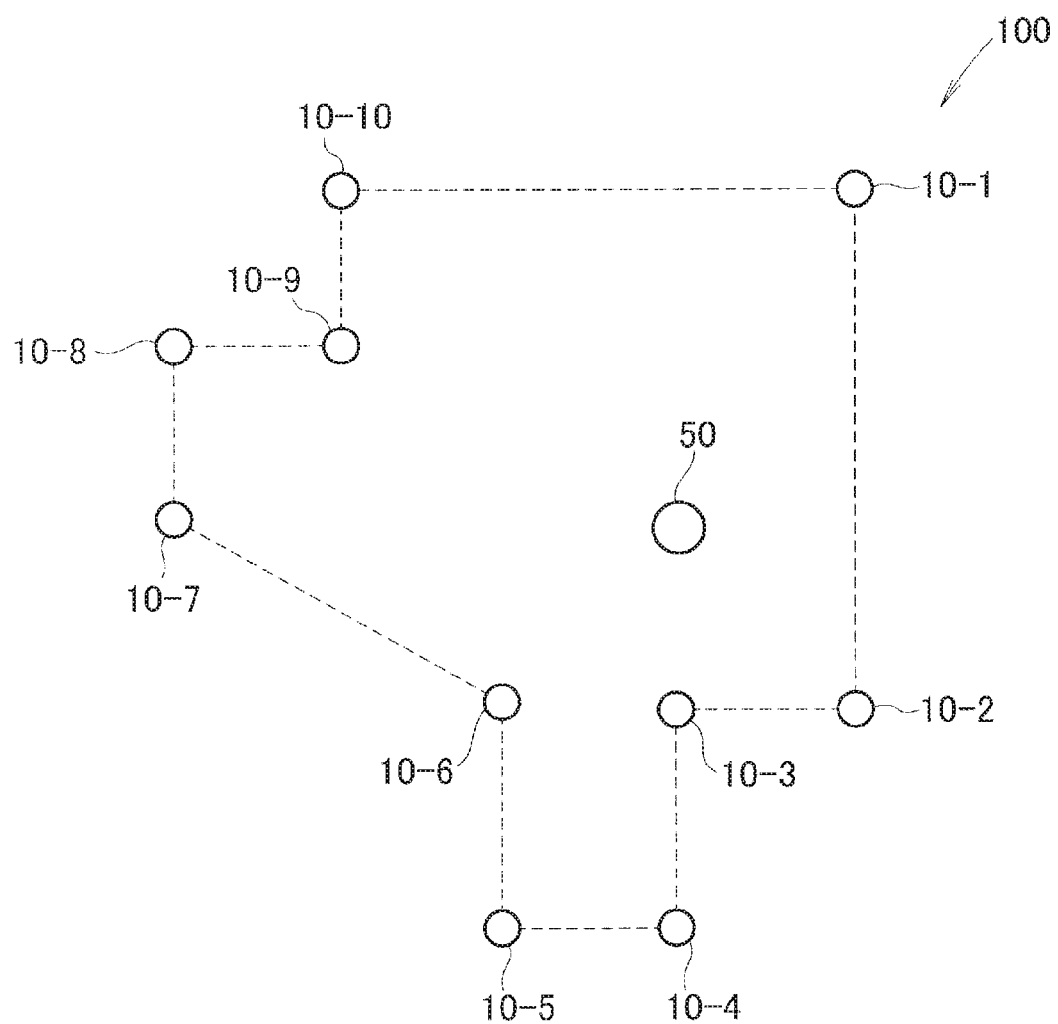
FIG. 1 is a view for explaining a working range defined by a plurality of marking devices.

FIG. 1 is a view for explaining a working range defined by a plurality of marking devices. In FIG. 1, the dotted lines indicate the working range within which a lawn mower 50 can travel or move. In one example, this working range is defined by, for example, ten marking devices 10-1, 10-2, . . . , 10-9, and 10-10. In other words, the lawn mower 50 can execute a work such as lawn mowing within this working range.

Note that the lawn mower 50 (a travelable working machine 50) is typically an autonomous lawn mowing robot. For example, this autonomous lawn mowing robot can recognize at least one of (preferably, a plurality of) the ten marking devices 10-1, 10-2, . . . , 10-9, and 10-10, and can execute lawn mowing while traveling within the working range in which a lawn is planted.

The working range is defined by the ten marking devices 10-1, 10-2, . . . , 10-9, and 10-10 in FIG. 1, but the working range of the lawn mower 50 may also be defined by at least three marking devices. In other words, it is also possible to arrange at least three marking devices at corners, and set the working range by these corners. The number (total number) of marking devices can, of course, be two or one, and the lawn mower 50 can estimate a predetermined working range by the two or one marking device. In other words, a working system 100 includes the lawn mower 50 and at least one marking device.

Figure 2A:
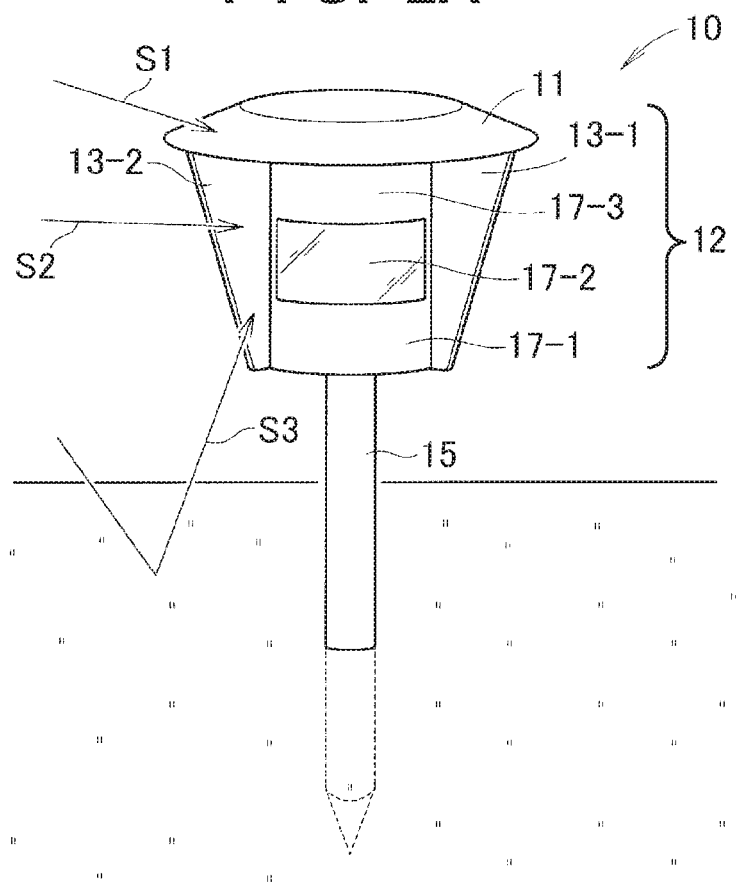
FIG. 2A shows a configuration example (outer appearance example) of the marking device.
Figure 2B:
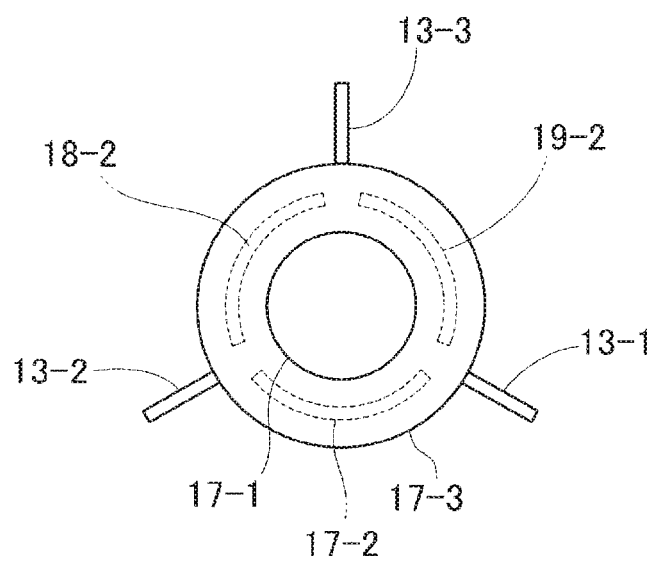
FIGS. 2B and 2C show configuration examples (outer appearance examples) of a housing and a light-emitting unit.
Figure 2C:
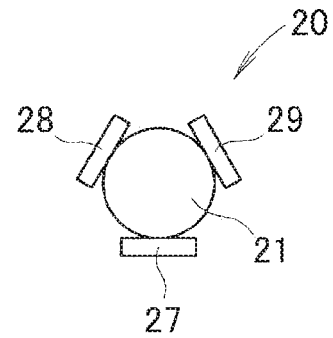

FIG. 2A shows a configuration example (outer appearance example) of the marking device 10. FIGS. 2B and 2C respectively show configuration examples (outer appearance examples) of a housing 12 and a light-emitting unit. Referring to FIG. 2A, the marking device 10 is buried in or installed on a working ground as a lawn. In other words, a worker or user can stick the marking device 10 into the position of a lawn, which corresponds to a corner or the like of a working range, in order to define the working range of the lawn.

The marking device 10 for the lawn mower 50 includes the housing 12 accommodating a light-emitting unit 20 shown in, for example, FIG. 2C, and a support 15 capable of supporting the housing 12. The light-emitting unit 20 can emit light (internal light). The housing 12 includes a transmitting portion (for example, a plurality of windows 17-2, 18-2, and 19-2) for transmitting the light (internal light) through the circumferential portion of the housing 12, and a roof 11 which covers the light-emitting unit 20 (for example, a plurality of light-emitting members 27, 28, and 29) accommodated in the housing 12.

As shown in FIG. 2A, the housing 12 accommodating the light-emitting unit 20 has the roof 11 for covering the light-emitting unit 20. When external light such as sunlight S1 irradiates the marking device 10, therefore, it is possible to prevent this external light from entering the light-emitting unit 20 or the transmitting portion such as the window 17-2.

If the housing 12 of the marking device 10 has no roof 11, the sunlight S1 may be reflected by, for example, the window 17-2. In other words, if the housing 12 of the marking device 10 has no roof 11, the lawn mower 50 may erroneously recognize the reflected light (sunlight S1) as the light-emitting unit 20 (the internal light) or the window 17-2.

In FIG. 2A, the housing 12 of the marking device 10 has the roof 11 capable of blocking the external light (sunlight S1) advancing to the light-emitting unit 20. Accordingly, the lawn mower 50 shown in FIG. 1 can more accurately recognize each of the ten marking devices 10-1, 10-2, ..., 10-9, and 10-10 shown in FIG. 1.

The roof 11 is preferably a light-shielding portion capable of shielding the sunlight S1. Since the roof 11 (the light-shielding portion) can shield the sunlight S1 as external light, the sunlight S1 is absorbed or diminished by the roof 11. Therefore, the lawn mower 50 shown in FIG. 1 can more accurately recognize each of the ten marking devices 10-1, 10-2, ..., 10-9, and 10-10 shown in FIG. 1.

The transmitting portion includes the three windows 17-2, 18-2, and 19-2 in FIG. 2B, and the light-emitting unit 20 includes the three light-emitting members 27, 28, and 29 in FIG. 2C. Each of the plurality of windows 17-2, 18-2, and 19-2 (for example, the window 17-2) can transmit light from a corresponding one (for example, the light-emitting member 27) of the plurality of light-emitting members 27, 28, and 29. The housing 12 includes a side wall (for example, a side wall member 13-2) formed between every two adjacent windows (for example, the windows 17-2 and 18-2) of the plurality of windows 17-2, 18-2, and 19-2.

In FIG. 2C, the light-emitting unit 20 includes the plurality of light-emitting members 27, 28, and 29. Therefore, the marking device 10 can emit light in a plurality of directions. In other words, when the lawn mower 50 shown in FIG. 1 travels or moves within the working range, the lawn mower 50 hardly misses each of the ten marking devices 10-1, 10-2, ..., 10-9, and 10-10 shown in FIG. 1.

In FIG. 2B, the housing 12 includes the side wall (for example, side wall members 13-1, 13-2, and 13-3). Accordingly, the side wall members 13-1, 13-2, and 13-3 can prevent the plurality of light-emitting members 27, 28, and 29 (a plurality of internal light components) from interfering with each other.

In addition, the side wall member 13-2, for example, can prevent external light S2 such as sunlight or a street light from entering the light-emitting unit 20 or the transmitting portion such as the window 17-2 (see FIG. 2A). Note that when the working ground is a lawn and the lawn contains water droplets (for example, rainwater), sunlight S3 is reflected by the lawn, but the side wall member 13-2, for example, can prevent the sunlight S3 as the reflected light from entering the light-emitting unit 20 or the transmitting portion such as the window 17-2 (see FIG. 2A).

Preferably, the housing 12 excluding the transmitting portion, in other words, the side wall such as the side wall member 13-2 and circumferential portions 17-1 and 17-3 of the transmitting portion can form a light-shielding portion. Since the housing 12 excluding the transmitting portion (that is, the roof 11, the side wall, and the circumferential portions) can shield the external light components S1, S2, and S3, the external light components S1, S2, and S3 are absorbed or diminished by the housing 12 excluding the transmitting portion. Therefore, the lawn mower 50 shown in FIG. 1 can more accurately recognize each of the ten marking devices 10-1, 10-2, ..., 10-9, and 10-10 shown in FIG. 1.

In FIG. 2B, the side wall includes the three side wall members 13-1, 13-2, and 13-3. The plurality of side wall members 13-1, 13-2, and 13-3 are arranged at equal intervals on the circumferential portion of the housing 12. The plurality of light-emitting members 27, 28, and 29 can emit light (a plurality of internal light components) in all directions (360°) from the circumferential portion (more specifically, the three windows 17-2, 18-2, and 19-2) of the housing 12.

When the side wall includes the plurality of side wall members 13-1, 13-2, and 13-3, the plurality of side wall members 13-1, 13-2, and 13-3 can more reliably prevent the plurality of light-emitting members 27, 28, and 29 (the plurality of internal light components) from interfering with each other. Also, when the plurality of side wall members 13-1, 13-2, and 13-3 are arranged at equal intervals on the circumferential portion of the housing 12, the light-emitting unit 20 can efficiently emit the plurality of internal light components.

In addition, when the light-emitting unit 20 omnidirectionally emits the plurality of internal light components, the lawn mower 50 shown in FIG. 1 more hardly misses each of the ten marking devices 10-1, 10-2, ..., 10-9, and 10-10 shown in FIG. 1 while traveling or moving within the working range. The number of the plurality of side wall members is three in FIG. 2B, and the number of the plurality of light-emitting members is three in FIG. 2C. For example, the three light-emitting members 27, 28, and 29 can have optical axes (see FIG. 4A) allocated at every 120°. Since the light-emitting unit 20 can form omnidirectional light by the three internal light components, the manufacturing cost of the marking device 10 capable of emitting omnidirectional light can be reduced.

Figure 3:
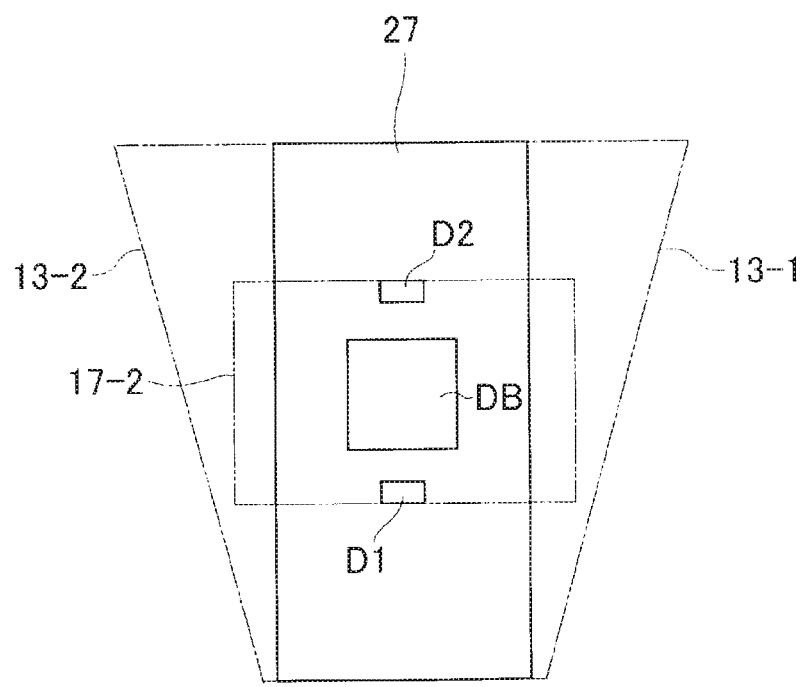
FIG. 3 shows a layout example of a window and side wall members.

FIG. 3 shows a layout example of the window 17-2 and side wall members 13-1 and 13-2. Referring to FIG. 3, for each of the plurality of windows (for example, the window 17-2 shown in FIG. 3), two corresponding adjacent side wall members (for example, the side wall members 13-1 and 13-2) of the plurality of side wall members are laid out on the two sides of the corresponding window (for example, the window 17-2) of the plurality of windows in a front view. Since the two adjacent side wall members 13-1 and 13-2 are appropriately laid out on the two sides of the window 17-2, the plurality of side wall members (the side wall) can more reliably prevent the plurality of light-emitting members (the plurality of internal light components) from interfering with each other.

In FIG. 3, the light-emitting member 27 preferably includes, for example, two infrared light-emitting elements D1 and D2, and further includes a heat radiation plate DB. Note that ON/OFF of the two infrared light-emitting elements D1 and D2 is controlled by, for example, a controller 21 (a logic board including a control circuit) shown in FIG. 2. Note also that the controller 21 can also control light-emitting elements (not shown) forming the light-emitting members 28 and 29.

In FIG. 3, the side wall members 13-1 and 13-2 are laid out on the two sides of or at the back of the window 17-2. In other words, FIG. 3 does not show the windows 18-2 and 19-2. When the lawn mower 50 recognizes the window 17-2 (the internal light), therefore, the influence (misrecognition) of the windows 18-2 and 19-2 (the internal light) can be avoided. Thus, the lawn mower 50 can more accurately recognize the marking device 10 based on the recognition of the window 17-2 (the internal light).

Note that in FIG. 3, the two infrared light-emitting elements D1 and D2 are positioned on the edges (the upper and lower sides) of the window 17-2. Accordingly, the window 17-2 can efficiently emit the internal light.

Figure 4A:
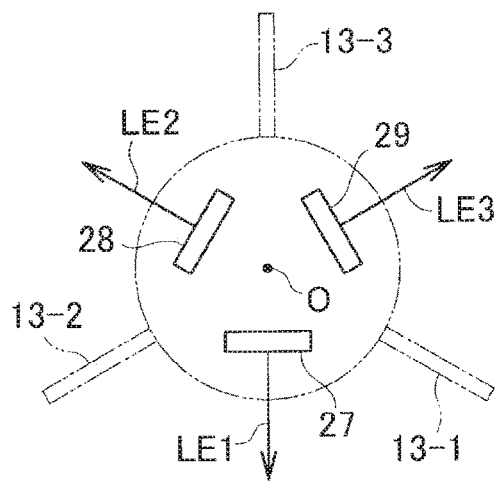
FIGS. 4A to 4C are views for explaining light (internal light) from the light-emitting unit.
Figure 4C:
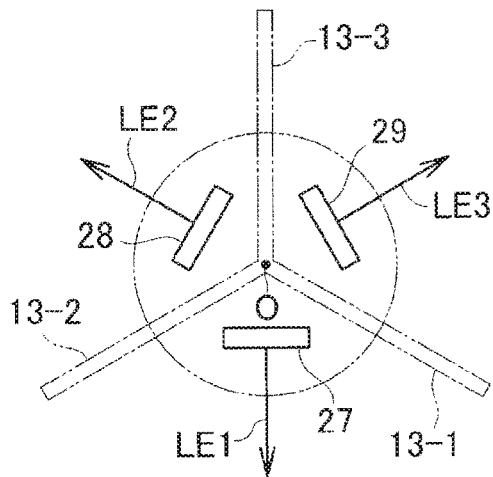
Figure 4B:
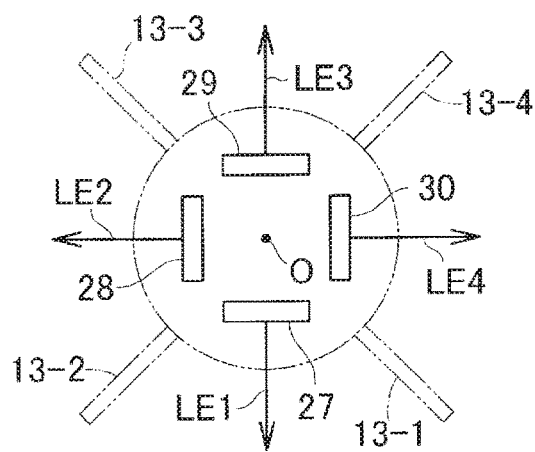

FIGS. 4A, 4B, and 4C are views for explaining the light (internal light) from the light-emitting unit 20. When the light-emitting unit 20 forms omnidirectional light by, for example, three internal light components, three light-emitting members 27, 28, and 29 shown in FIG. 4A can have optical axes LE1, LE2, and LE3 allocated at every 120° (an angle obtained by dividing 360° by 3). Alternatively, when the light-emitting unit 20 forms omnidirectional light by, for example, four internal light components, light-emitting members 27, 28, 29, and 30 shown in FIG. 4B can have optical axes LE1, LE2, LE3, and LE4 allocated at every 90° (an angle obtained by dividing 360° by 4). Since the light-emitting unit 20 can form omnidirectional light by, for example, four internal light components, the manufacturing cost of the marking device 10 capable of emitting omnidirectional light can be reduced. In other words, the number a (an integer of 2 or more) of the plurality of light-emitting members is preferably the same as the number a of the plurality of side wall members, and three or four, from the viewpoint of the manufacturing cost.

When the light-emitting unit 20 forms omnidirectional light by, for example, three internal light components, the side wall members 13-1, 13-2, and 13-3 can extend outward from a central axis O of the circumferential portion of the housing 12 as an example (see FIG. 4C). In FIG. 4C, the quantity of each of the three internal light components increases by reflection in the circumferential portion of the housing 12. Accordingly, the lawn mower 50 can more accurately recognize the marking device 10 based on the recognition of, for example, the window 17-2 (the internal light enhanced by the side wall members 13-1 and 13-2 (blades) shown in FIG. 4C).

When the light-emitting unit 20 forms omnidirectional light by, for example, four internal light components as shown in FIG. 4C when modifying or improving FIG. 4B, the side wall members 13-1, 13-2, 13-3, and 13-4 (blades) can extend outward from the central axis O of the circumferential portion of the housing 12 as an example.

Figure 5:
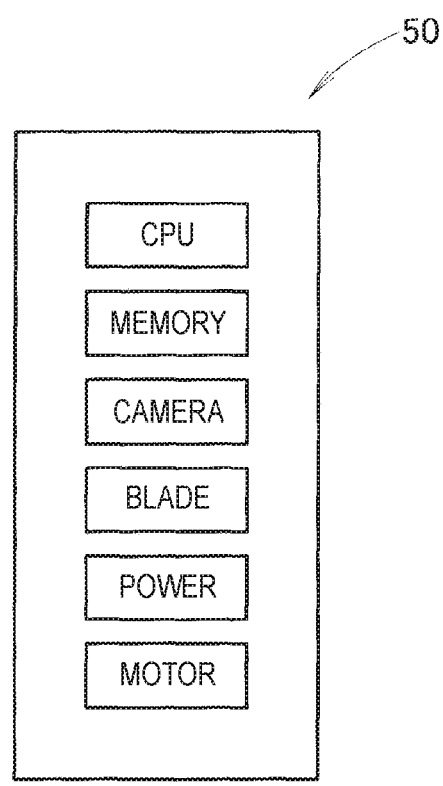
FIG. 5 is a view showing a configuration example (functional block example) of a lawn mower.

FIG. 5 shows a configuration example (functional block example) of the lawn mower 50. As an example, the lawn mower 50 includes a processing unit CPU, a storage unit MEMORY, a recognition unit CAMERA, a working unit BLADE, a power supply unit POWER, and an activation unit MOTOR. The processing unit CPU is typically a microcomputer. The storage unit MEMORY stores a program which causes the processing unit CPU to execute a predetermined operation or work. The storage unit MEMORY can form a work area of the processing unit CPU. The storage unit MEMORY can also store data necessary to execute an operation or work set in the processing unit CPU.

The recognition unit CAMERA is typically a camera, and preferably an infrared camera. The working unit BLADE is typically a blade for a lawn mowing work. The power supply unit POWER is typically a chargeable battery. The activation unit MOTOR typically includes an electric motor and wheels. Even after sunset, for example, the lawn mower 50 including an infrared camera can automatically execute a lawn mowing work within a working range at night while automatically traveling within the working range.

For example, when the transmitting portion such as the window 17-2 shown in FIG. 2A contains a light diffuser, the lawn mower 50 can more accurately recognize light (internal light) evenly transmitted (emitted) from the transmitting portion (the light-emitting unit). In other words, the lawn mower 50 can more accurately recognize a remote marking device 10.

The present invention is not limited to the above-described exemplary embodiments, and those skilled in the art can easily change the above-described exemplary embodiments to a range contained in the scope of claims.

This application claims the benefit of Japanese Patent Application No. 2016-071846, filed Mar. 31, 2016 which is hereby incorporated by reference herein in its entirety.

What is claimed is:

1. A marking device comprising:
    a light-emitting unit configured to emit light;
    a housing configured to accommodate the light-emitting unit; and
    a support configured to support the housing,
    wherein the housing includes:
        a transmitting portion configured to transmit the light through a circumferential portion of the housing; and
        a roof covering the light-emitting unit accommodated in the housing,
    the transmitting portion includes a plurality of windows,
    the housing includes a side wall member formed between every two adjacent windows of the plurality of windows,
    the light-emitting unit includes a plurality of light-emitting members,
    each of the plurality of windows is configured to transmit light from a corresponding one of the plurality of light-emitting members,
    the plurality of side wall members are arranged at equal intervals on the circumferential portion of the housing, and
    the plurality of light-emitting members are configured to omnidirectionally emit the light from the circumferential portion of the housing.

2. The device according to claim 1, wherein the number of the plurality of side wall members is α (an integer of not less than 2),
    the number of the plurality of light-emitting members is α, and
    the plurality of light-emitting members have optical axes allocated for every angle obtained by dividing 360° by α.

3. The device according to claim 1, wherein the number of the plurality of side wall members is 3,
    the number of the plurality of light-emitting members is 3, and
    the plurality of light-emitting members have optical axes allocated for every 120°.

4. The device according to claim 1, wherein the number of the plurality of side wall members is 4,
    the number of the plurality of light-emitting members is 4, and
    the plurality of light-emitting members have optical axes allocated for every 90°.

5. A marking device comprising:
    a light-emitting unit configured to emit light;
    a housing configured to accommodate the light-emitting unit; and
    a support configured to support the housing,
    wherein the housing includes:
        a transmitting portion configured to transmit the light through a circumferential portion of the housing; and
        a roof covering the light-emitting unit accommodated in the housing,
    the transmitting portion includes a plurality of windows,
    the housing includes a side wall member formed between every two adjacent windows of the plurality of windows, and
    for each of the plurality of windows, two corresponding adjacent side wall members of the plurality of side wall members are arranged on two sides of the window in a front view.

6. The device according to claim 1, wherein the roof comprises a light-shielding portion configured to shield sunlight.

7. The device according to claim 6, wherein the housing excluding the transmitting portion forms the light-shielding portion.

8. The device according to claim 1, wherein the transmitting portion contains a light diffuser.

9. A lawn mower system comprising:
a lawn mower; and
at least one marking device for the lawn mower,
wherein the at least one marking device includes:
- a light-emitting unit configured to emit light;
- a housing configured to accommodate the light-emitting unit; and
- a support configured to support the housing, wherein the housing includes:
- a transmitting portion configured to transmit the light through a circumferential portion of the housing; and
- a roof covering the light-emitting unit accommodated in the housing, the transmitting portion includes a plurality of windows, and the housing includes a side wall formed between every two adjacent windows of the plurality of windows.

10. The lawn mower system according to claim 9, wherein the lawn mower is further configured to mow a lawn in a working range defined by the at least one marking device.

* * * * *